(12) United States Patent
Choi et al.

(10) Patent No.: US 9,720,855 B2
(45) Date of Patent: Aug. 1, 2017

(54) VIRTUAL DEVICE BASED SYSTEMS WITH ACCESS TO PARTS OTHER THAN DATA STORAGE ELEMENTS THROUGH THE VIRTUAL DEVICE

(71) Applicants: Chang-Eun Choi, San Jose, CA (US); Bin Lu, San Jose, CA (US); Yang Yu, San Jose, CA (US); Karnik Shah, San Jose, CA (US); Hingkwan Huen, Daly City, CA (US)

(72) Inventors: Chang-Eun Choi, San Jose, CA (US); Bin Lu, San Jose, CA (US); Yang Yu, San Jose, CA (US); Karnik Shah, San Jose, CA (US); Hingkwan Huen, Daly City, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 27 days.

(21) Appl. No.: 14/676,518

(22) Filed: Apr. 1, 2015

(65) Prior Publication Data

US 2016/0055011 A1    Feb. 25, 2016

Related U.S. Application Data

(60) Provisional application No. 62/039,400, filed on Aug. 19, 2014.

(51) Int. Cl.
*G06F 13/12* (2006.01)
*G06F 13/38* (2006.01)
*G06F 13/00* (2006.01)
*G06F 13/10* (2006.01)
*G06F 9/455* (2006.01)

(52) U.S. Cl.
CPC ........ *G06F 13/102* (2013.01); *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 8,078,788 | B2 | 12/2011 | Chang et al. |
| 8,732,527 | B2 | 5/2014 | Tabone et al. |
| 2010/0185874 | A1 | 7/2010 | Robles et al. |
| 2012/0042376 | A1 | 2/2012 | Dolgunov et al. |
| 2012/0117562 | A1* | 5/2012 | Jess ..................... G06F 9/45558 718/1 |
| 2014/0047144 | A1* | 2/2014 | Haga ..................... G06F 3/0605 710/74 |
| 2015/0082014 | A1* | 3/2015 | Funaki ................ G06F 9/45558 713/2 |

* cited by examiner

*Primary Examiner* — David E Martinez
(74) *Attorney, Agent, or Firm* — Renaissance IP Law Group LLP

(57) ABSTRACT

An embodiment includes a system, comprising: a device configured to present a logical device and enable a virtual device in response to a control signal; and a processor coupled to the device and configured to: present the logical device through a first device interface; transmit the control signal to the device to enable the virtual device; and after the virtual device is enabled, present the virtual device through a second device interface.

10 Claims, 9 Drawing Sheets

FIG. 9
| Value | Description |
|---|---|
| 0x00 | Success |
| 0x01-0x0F | Reserved |
| 0x10 | General Error |
| 0x11 | Firmware Install Error |
| 0x12 | Error in downloading firmware |
| Others | Reserved |
FIG. 10
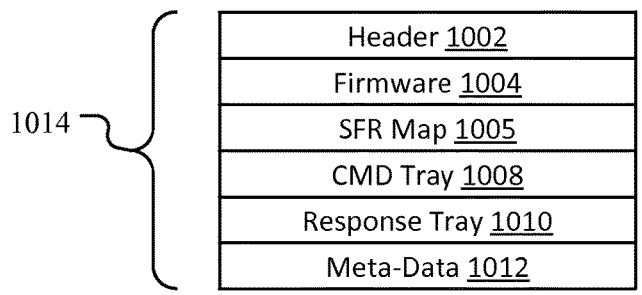
FIG. 11
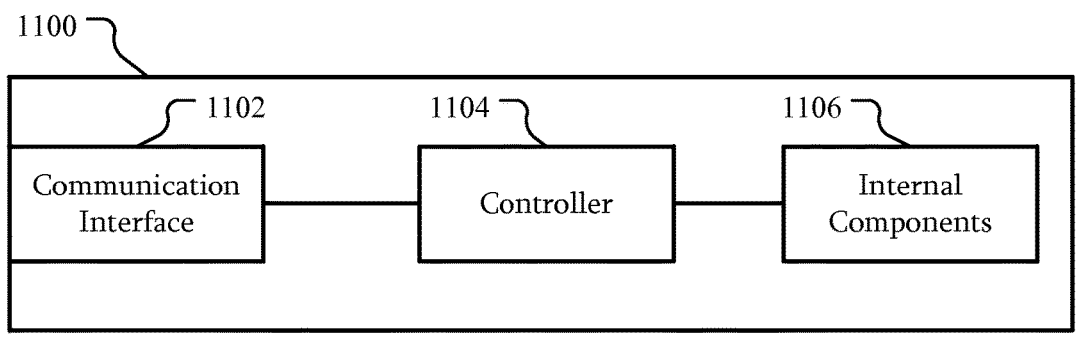

VIRTUAL DEVICE BASED SYSTEMS WITH ACCESS TO PARTS OTHER THAN DATA STORAGE ELEMENTS THROUGH THE VIRTUAL DEVICE

CROSS-REFERENCE TO RELATED APPLICATION

This application claims the benefit of U.S. Provisional Patent Application No. 62/039,400, filed Aug. 19, 2014, which is hereby incorporated by reference herein, in its entirety, for all purposes.

BACKGROUND

This disclosure relates to devices and systems with virtual devices and, in particular, devices and systems with virtual devices that may be selectively enabled.

Some systems include devices including functions that are relatively inaccessible, both physically and functionally. For example, a memory device, such as an eMMC device, may be soldered in place. As a result, obtaining physical access to the device may be relatively difficult. Moreover, accessing some functions of the device may require custom commands and may require a custom operating system to send those commands to the device. As a result, accessing the device may be relatively difficult and may require replacing an operating system or components of the operating system. These options for accessing and/or testing a device may be unavailable to particular users, such as end-users of systems including the device.

SUMMARY

An embodiment includes a system, comprising: a device configured to present a logical device and enable a virtual device in response to a control signal; and a processor coupled to the device and configured to: present the logical device through a first device interface; transmit the control signal to the device to enable the virtual device; and after the virtual device is enabled, present the virtual device through a second device interface.

An embodiment includes a device, comprising: a communication interface; a controller coupled to the communication interface; the controller configured to: present a logical device through the communication interface; enable a virtual device in response to an enable signal received through the communication interface; and when the virtual device is enabled, present the virtual device through the communication interface.

An embodiment includes a method, comprising: receiving, by a device, a control signal; determining, by the device, if an enable command is included in the control signal; and enabling, by the device, a virtual device in response to the enable command.

An embodiment includes a method, comprising: instructing a device on a target system to transition from a first operating mode to a second operating mode, wherein: in the first operating mode, the device is configured to disable a virtual device associated with the device; and in the second operating mode, the device is configured to enable the virtual device; and accessing the virtual device through the target system.

BRIEF DESCRIPTION OF SEVERAL VIEWS OF THE DRAWINGS

FIG. 9 is a table of status values according to an embodiment.

FIG. 10 is a block diagram representing memory mapping of a virtual device according to an embodiment.

FIG. 11 is a schematic view of a device according to an embodiment.

DETAILED DESCRIPTION

Figure 1:
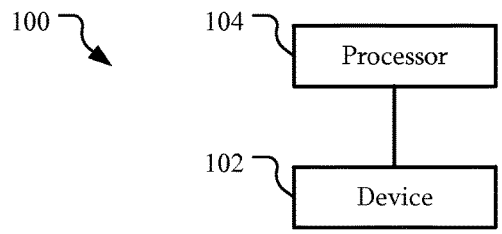
FIG. 1 is a schematic view of a system according to an embodiment.

The embodiments relate to devices and systems with virtual devices and, in particular, virtual devices that may be selectively enabled. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods and systems provided in particular implementations.

However, the methods and systems will operate effectively in other implementations. Phrases such as "an embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of this disclosure. The embodiments will also be described in the context of particular methods having certain steps. However, the methods and systems operate according to other methods having different and/or additional steps and steps in different orders that are not inconsistent with the embodiments. Thus, embodiments are not intended to be limited to the particular embodiments shown, but are to be accorded the widest scope consistent with the principles and features described herein.

The embodiments are described in the context of particular systems and devices having certain components. One of ordinary skill in the art will understand that in other embodiments, systems and devices may have other and/or additional components and/or other features. However, one of ordinary skill in the art will readily recognize that the methods and systems are consistent with other structures. Methods and systems may also be described in the context of single elements. However, one of ordinary skill in the art will readily recognize that the methods and systems are consistent with the use of systems and devices having multiple elements.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

FIG. 1 is a schematic view of a system according to an embodiment. In this embodiment, the system 100 includes a device 102 coupled to a processor 104. The device 102 may include any manner of device that may be communicatively coupled to a processor 104. For example, the device 102 may be a memory device, a mass storage device, a user interface device, a display device, a network device, or the like. The processor 104 may include a general purpose processor, an application specific integrated circuit, a system on a chip (SOC), a programmable logic device, a microcontroller, discrete logic devices, combinations of such components, or the like.

The device 102 may be coupled to the processor 104 through any manner of communicative coupling. For example, the coupling between the device 102 and the processor 104 may include bond wires, through-silicon vias (TSV), or other structures suitable to connect integrated circuits. In another example, the coupling may include a system bus, traces on a printed circuit board (PCB), or the like. In another example, the coupling may include interfaces and cables compatible with the Universal Serial Bus (USB), serial ATA (SATA), serial attached SCSI (SAS), various JEDEC standards, or the like. Although particular examples, the device 102 and processor 104 may be coupled in other manners.

Figure 2:
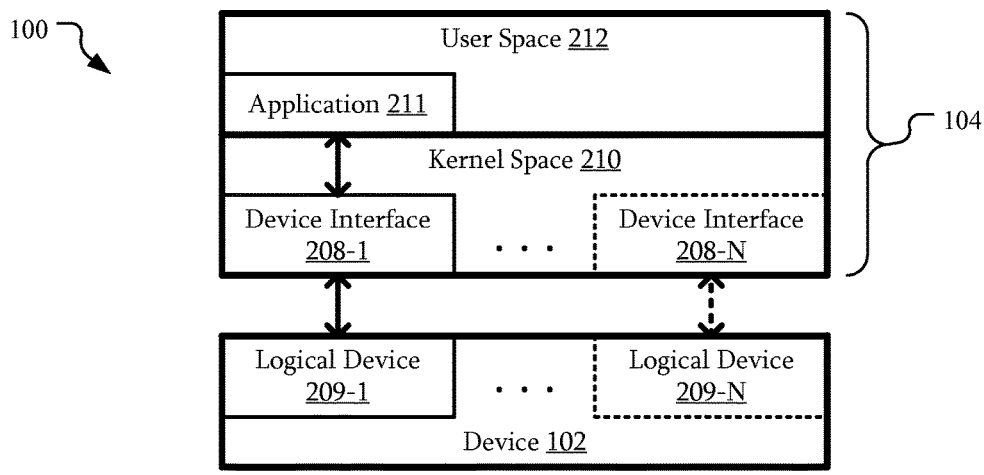
FIG. 2 is a block diagram representing functions of the system of FIG. 1 according to an embodiment.

FIG. 2 is a block diagram representing functions of the system 100 of FIG. 1 according to an embodiment. Referring to FIGS. 1 and 2, in this embodiment, the functions of the processor 104 are organized into kernel space 210 and user space 212. Kernel space 210 includes the operating system, device drivers, memory managers, or the like. User space 212 includes software outside of the kernel space 210. In an embodiment, software in the kernel space 210 may run at a higher privilege level than that of software in the user space 212. Although a particular division of software has been used as an example, in other embodiments, no division or other divisions may exist.

In this embodiment, the device 102 may be configured to present one or more logical devices 209, represented by logical devices 209-1 to 209-N. A logical device 209 is a representation of a particular configuration of the device 102. A logical device 209 may be associated with a physical configuration of the device 102; however, a logical device 209 may also be associated with a logical division that may or may not correspond with a physical division. For example, in an embodiment, the device 102 may have dedicated connections to the processor 104 associated with each of the logical devices 209; however, in other embodiments, each of the logical devices 209 may communicate with the processor 104 through a common communication link while the logical devices 209 are logically divided on the device 102.

A logical device 209 may be associated with the entire device 102, a subset of the device 102, or the like. Using a data storage device as an example, a logical device 209-1 may be the entire storage area of the device 102. Another logical device 209-2 may be a partition within the entire storage area of the device 102. The logical devices 209 may, but need not be the same type of logical device. For example, one logical device 209-1 may be a display device while another logical device 209-2 of the same device 102 may be an audio output device.

The processor 104 is configured to present one or more device interfaces 208, represented by device interfaces 208-1 to 208-N. A device interface 208 is the interface through which other software, such as application 211 in user space 212 or another aspect of the operating system in kernel space 210, may access the device 102 and, in particular, a logical device 209. Using the data storage device as an example again, a device interface 208 may be an interface to the entire storage area of the device 102, a partition of the entire storage area, or the like.

In this embodiment, the application 211 is configured to communicate with the device interface 208-1. The device interface 208-1 is associated with the logical device 209-1.

Accordingly, the application 211 may access the logical device 209-1. The application 211 may also be capable of communicating with any of the device interfaces 208 and hence, the associated logical devices 209; however, for clarity, arrows illustrating such communication are omitted.

Although a one-to-one correspondence between a device interface 208 and a logical device 209 has been illustrated, the device interfaces 208 and the logical devices 209 may be related in different ways. For example, a single device interface 208 may be associated with multiple logical devices 209. In another example, multiple device interfaces 208 may be associated with a single logical device 209.

Figure 3:
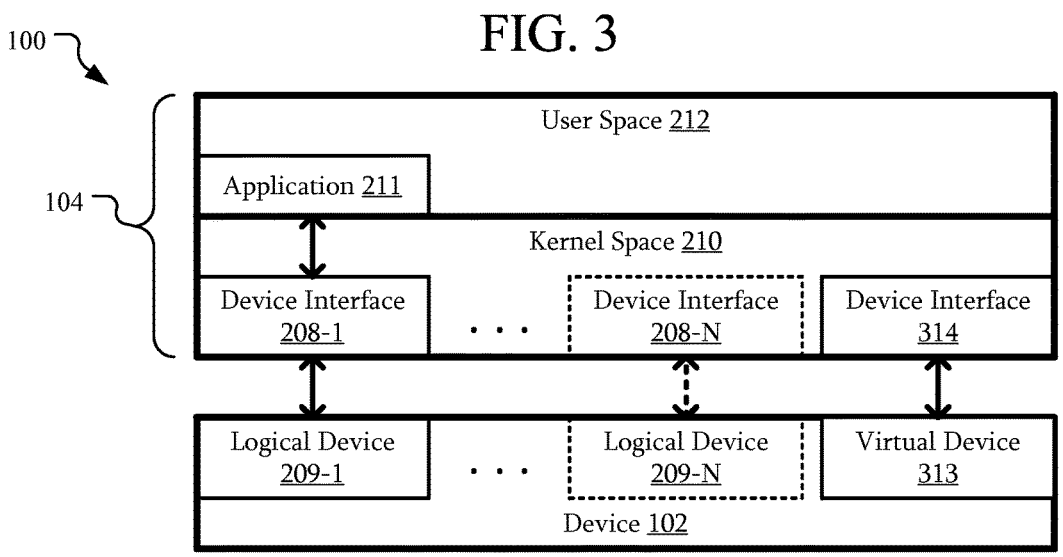
FIG. 3 is a block diagram representing functions of the system of FIG. 1 after enabling a virtual device according to an embodiment.

FIG. 3 is a block diagram representing functions of the system of FIG. 1 after enabling a virtual device according to an embodiment. Referring to FIGS. 1 and 3, in an embodiment, the processor 104 may be configured to transmit a control signal to the device 102. For example, the application 211 may transmit the control signal to the device 102 through the device interface 208-1 or another device interface 208. In response, the device 102 is configured to enable a virtual device 313. The processor 104 may be configured to present a new device interface 314 corresponding to the virtual device 313. Although a single device interface 314 has been used as an example, multiple device interfaces 314 may be used to access the virtual device 313. Moreover, although a single virtual device 313 has been described as being enabled, multiple virtual devices 313 may be enabled. Furthermore, although the device interface 314 may be separate from one or more of the device interfaces 208-1 to 208-N, the device interface 314 may represent a different aspect of one of those device interfaces 208-1 to 208-N through which the virtual device 313 may be accessed. In other words, a single device interface 208-1 may allow for access to both logical device 209-1 and virtual device 313, when enabled.

The virtual device 313 is a device that is not directly associated with hardware of the device 102. Using the data storage device as an example again, the virtual device 313 may be a virtual partition. That is, as a virtual partition, the virtual device would not directly correspond to storage elements of the data storage device, in contrast to other partitions of the data storage device.

The virtual device 313 may, but need not be a same type of device as any of the logical devices 209 of the device 102. For example, if the logical device 209 is a partition of a data storage device, the virtual device may be a serial port. However, in some embodiments, the virtual device 313 may be a type of device that is usable by the operating system without replacement of a portion of the operating system. For example, if the virtual device 313 and the logical device 209-1 are both partitions, the operating system may be capable of accessing the virtual device 313 as a partition as the operating system was otherwise capable of accessing the logical device 209-1 as a partition without change. In another example, if both the virtual device 313 and the logical device 209-1 are network devices, the operating system may again be capable of accessing both network devices.

The control signal used to enable the virtual device 313 may take many different forms. In some embodiments, the control signal may be particular to the type of device 102. For example, as will be described in further detail below, a device 102 may be configured to receive firmware updates. Firmware that is invalid may be transmitted to the device 102 as the control signal to indicate that the virtual device 313 should be enabled.

Similarly, a control signal may be used to disable the virtual device 313. Using the example of the invalid firmware described above, an invalid firmware may be transmitted again to the device 102. In response, the device 102 may disable the virtual device 313.

In an embodiment, the control signal used to disable the virtual device 313 may be substantially identical to the control signal used to enable the virtual device 313. That is, the control signal may operate as a toggle signal to enable or disable the virtual device 313 depending on its current state. However, in other embodiments, the control signals used to enable and disable the virtual device 313 may be different.

Although invalid firmware has been used as an example, the control signal may take different forms. For example, a particular code written to a particular address range of a partition may be used to transmit a control signal. In another example, a particular packet with a particular address, payload, checksum, or the like may be transmitted to a network device as a control signal. Any communication may be used as a control signal if that communication may otherwise be sent to a device 102 and also be modified in such a way that the device 102 is able to distinguish the control signal from other communications.

Figure 4:
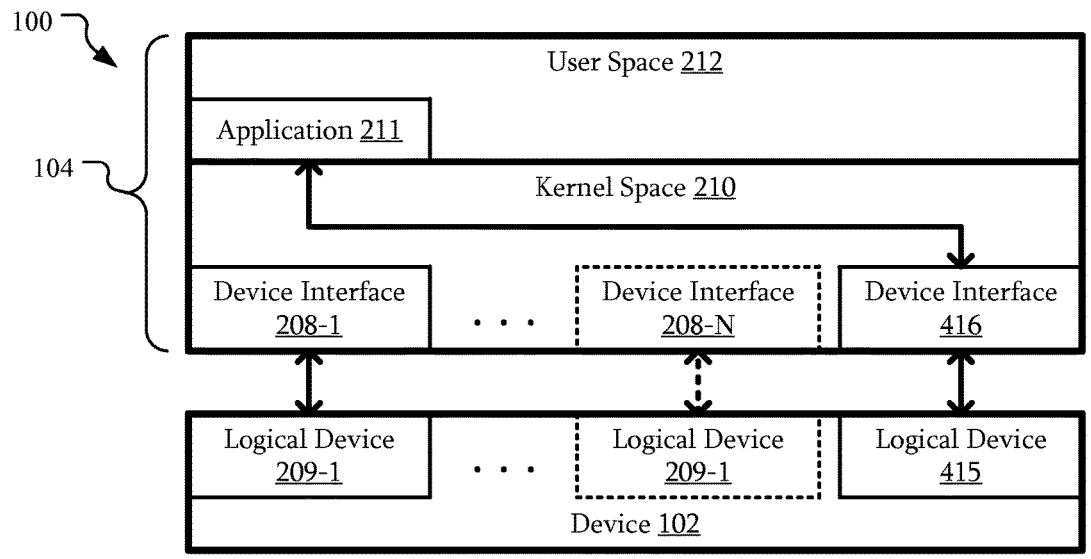
FIG. 4 is a block diagram representing functions of the system of FIG. 1 according to another embodiment.

FIG. 4 is a block diagram representing functions of the system of FIG. 1 according to another embodiment. Referring to FIGS. 1 and 4, in this embodiment, an additional logical device 415 is presented by the device 102. The logical device 415 is accessible through the device interface 416. The device 102 may be configured to receive the control signal through the device interface 416 and hence, through the logical device 415. Accordingly, the interface through which an application 211 or other software may indicate that a virtual device should be enabled, disabled, configured, or the like may be received through a particular device interface 416 corresponding to a particular logical device 415.

Figure 5:
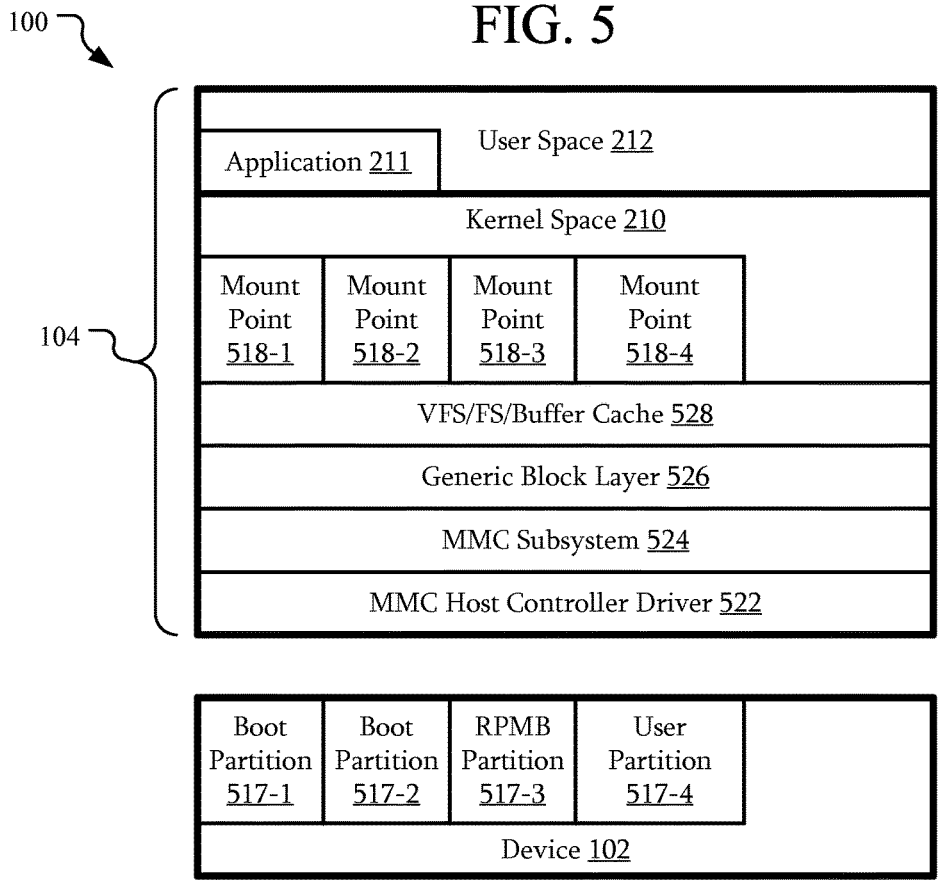
FIG. 5 is a block diagram representing functions of the system of FIG. 1 according to another embodiment.

FIG. 5 is a block diagram representing functions of the system of FIG. 1 according to another embodiment. Referring to FIGS. 1 and 5, in this embodiment, the device 102 is a storage device configured to initially present four partitions 517-1 to 517-4. For example, the device 102 may be a MultiMediaCard (MMC) such as an eMMC device. Here partitions 517-1 and 517-2 are boot partitions, partition 517-3 is a replay protected memory block (RPMB) partition, and partition 517-4 is a user partition. Although particular partitions have been used as examples, the device 102 may have a different number of partitions and different types of partitions.

The kernel space 210 includes an MMC host controller driver 522 an MMC subsystem 524, a generic block layer 526, and a virtual file system (VFS)/file system (FS)/buffer cache layer 528. These layers are examples of portions of software in the kernel space 210 that permit access to the partitions 517. Through the layers in the kernel space 210, the partitions 517 may be mounted on mount points 518. For example, the boot partitions 517-1 and 517-2, RPMB partition 517-3, and user partition 517-4 may be mounted on mount points 518-1 and 518-2, mount point 518-3, and mount point 518-4, respectively. Arrows or other annotations illustrating the association between the mount points 518 and partitions 517 are omitted for clarity.

In an embodiment, the device 102 may be configured to receive a firmware update. Through the firmware update, a control signal may be sent to the device 102 to enable the virtual partition. For example, a firmware update that is invalid may be transmitted to the device 102. The firmware may be invalid by having, for example, an intentionally incorrect checksum, an incorrect or excessive size, or the like; however, other techniques of creating an invalid firmware may be used depending on conditions for determining whether the firmware is valid. Once the device 102 receives the invalid firmware, the device 102 may enable the virtual partition.

Figure 6:
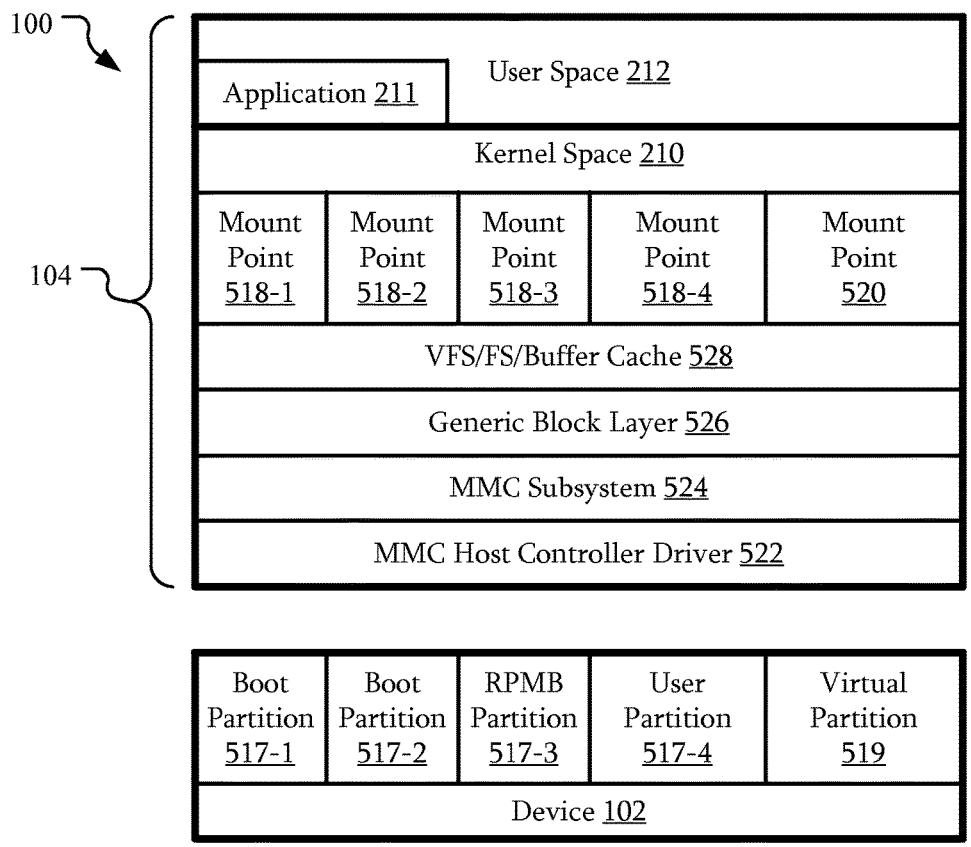
FIG. 6 is a block diagram representing functions of the system of FIG. 1 after enabling a virtual device according to another embodiment.

FIG. 6 is a block diagram representing functions of the system of FIG. 1 after enabling a virtual device according to another embodiment. Referring to FIGS. 1, 5, and 6, in the mode illustrated by FIG. 5, the virtual partition 519 is not enabled on the device 102. For example, a partition table or other technique of indicating the partitions of the device 102 may initially indicate that the virtual partition 519 is not present. However, after receiving the invalid firmware, the device 102 is configured to enable the virtual partition 519.

In an embodiment, the virtual partition 519 may, but need not be immediately mounted. For example, after enabling the virtual partition 519, the system 100 may reboot. After a reboot, because the virtual partition 519 is now enabled, the operating system may be configured to automatically mount the virtual partition 519 at the mount point 520. In other embodiments, the operating system may be configured to automatically mount the virtual partition 519 at the virtual partition mount point 520 without a reboot, for example, in response to detecting that the virtual partition 519 is available.

Invalid firmware may again be transmitted to the device 102. In response the virtual partition 519 may be disabled. As described above, the invalid firmware may be the same or different from the invalid firmware used to enable the virtual partition 519. Furthermore, a reboot of the system 100 may, but need not be used to unmount the virtual partition 519 from the virtual partition mount point 520.

In a particular embodiment, the device 102 is capable of receiving field-firmware-update (FFU) commands. Through FFU commands, the invalid firmware may be transmitted to the device 102. In particular, as the FFU commands and the firmware update using invalid firmware to enable the virtual partition 519 may be used in the field, a special operating system, return of the system 100 to a service center, or the like may not be needed.

Figure 7:
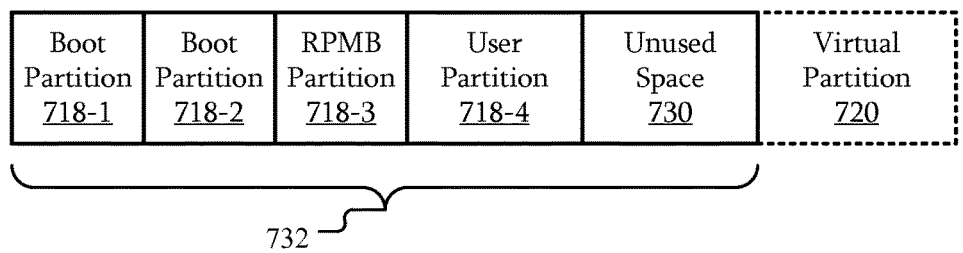
FIG. 7 is a block diagram representing an addressable range of a device according to an embodiment.

FIG. 7 is a block diagram representing an addressable range of a device according to an embodiment. In this embodiment, the solid lined portions identify the partitions and potential partitions of an addressable range 700 of a storage device. Here, the boot partitions 718-1 and 718-2, RPMB partition 718-3, and user partition 718-4 are all partitions within physical storage space 732 on the storage device. Unused space 730 represents a remainder of the physical storage space 732 unused by any partitions. However, in this embodiment, the virtual partition 720 does not directly correspond to the physical storage space 732 and may present information stored in and separate from the physical storage space 732. For example, the virtual partition 720 may reflect information separate from data stored in the physical storage space 732, information stored in the physical storage space 732, or combinations of such information.

The virtual partition 720 may still be accessed in the same manner as the other partitions 718. For example, the virtual partition 720 may have a separate, independent address range. However, in other embodiments, the physical storage space 732 may be addressable by a contiguous address range, such as in contiguous blocks, sectors, or the like. The virtual partition 720 may be accessible through an address range that is contiguous with the end of the physical storage space 732. However, as the virtual partition 720 does not correspond to the address range of the physical storage space 732, the virtual partition 720 may not directly correspond to the physical storage space 732.

In an embodiment, enabling a virtual partition 720 may not change aspects of the other partitions 718-1 to 718-4. For example, all of the data, sizes, orientations, or the like of the partitions 718-1 to 718-4 remain the same after the virtual partition 720 is enabled. In particular, even if then entire physical storage space 732 is occupied by existing partitions 718, the virtual partition 720 may still be enabled.

In an embodiment, a particular device 102 may be configured to present a predefined set of partitions. For example, an eMMC device may be configured to present up to four general purpose partitions (GPPs). The virtual partition 720 may take the place of such a GPP.

Figure 8:
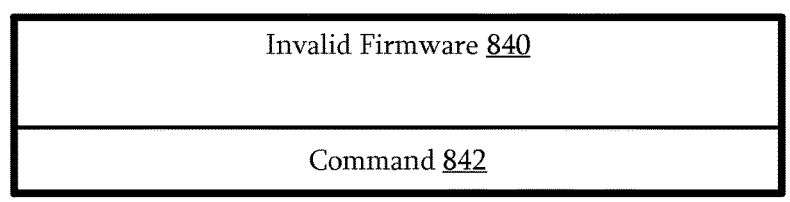
FIG. 8 is a block diagram representing invalid firmware according to an embodiment.

FIG. 8 is a block diagram representing invalid firmware according to an embodiment. As described above, a control signal used to enable or disable a virtual device may include invalid firmware 840. Here, the invalid firmware 840 includes a command 842.

The command 842 may include a variety of different commands. For example, the command 842 may include a command to enable a virtual device, disable a virtual device, reconfigure a virtual device, or the like. Although the command 842 is illustrated as being in a particular portion of the invalid firmware 840, the command 842 may be in different positions within the invalid firmware 840. In addition, although one command 842 is illustrated in the invalid firmware 840, multiple different or similar commands 842 may be present in the invalid firmware 840. For example, a first command in the invalid firmware 840 may disable a previously enabled virtual device while a second command in the invalid firmware 840 may enable another presently disabled virtual device.

FIG. 9 is a table of status values according to an embodiment. Referring to FIGS. 1 and 9, in an embodiment, a value may be read from the device 102 after attempting to perform a firmware update. The values communicate information related to the attempt to update the firmware. If invalid firmware is transmitted to the device 102, a response from the device 102 may include a value of 0x11 indicating a firmware install error or, in particular, may include particular bits set indicating that an error occurred and that the error was related to installing firmware.

Another field, bit, or the like may indicate a success, failure, status or otherwise distinguish invalid firmware associated with a virtual device from other invalid firmware. For example, if invalid firmware with an enable command is transmitted to the device 102, when the value is read from the device 102, the value may have a bit set indicating that there was an error installing the firmware and a bit indicating whether executing the command was successful. A bit that would result in a value in the reserved range may be set to indicate the success or failure. In a particular example, the third least-significant bit may be set if executing the command was successful. Thus, a successful transmission of invalid firmware and successful execution of the command may result in a value of 0x15 or 00010101b where bits are set indicating that an error occurred, the error involved firmware installation, and the command within the invalid firmware was successfully executed. In contrast, a successful transmission of invalid firmware and an unsuccessful execution of the command or a lack of a command may result in a value of 0x11 or 00010001b. Although particular examples have been given, in other embodiments, bits may be set or cleared to indicate other information, such as that the command was received but it was not successfully executed, that the command was invalid, the status of a virtual device, or the like.

FIG. 10 is a block diagram representing memory mapping of a virtual device according to an embodiment. As described above, the virtual device may be presented as a virtual partition. The partition may include a memory-mapped interface to various attributes of the device 102. For example, address space 1014 may include a variety of different memory-mapped information.

In this embodiment, a header 1002 may indicate the types of information available, the address span, or the like related to the virtual partition. Firmware 1004 may be mapped to the firmware of the device 102. That is, the current firmware of the device 102 may be read and/or written through the virtual device. In an embodiment, the firmware 1004 address range may be mapped to the entire storage space available for firmware; however, in other embodiments, the firmware 1004 address range may be mapped to the range of currently existing firmware.

SFR map 1005 is a memory mapped interface to special function registers (SFRs) of the device 102. Thus, SFRs may be read and/or written through the SFR map 1005 of the partition.

Command tray 1008 and response tray 1008 may be address space where commands may be written and responses may be received. For example, a command to be executed on the device 102 may be written to the command tray 1008. The device 102 may execute the command and generate a response. The response may be read from the address range of the response tray 1010. In a particular embodiment, once a particular action occurs, such as writing a byte to the last location in the address range of the command tray 1008, the device 102 may use that action as an indication that the command has been written to the command tray 1008 and may now be executed. That is, the command may be written to the command tray 1008 and, after writing the command, a byte may be written to the last byte of the command tray 1008 to instruct the device 102 to execute the previously written command. Although a particular example of a sequence resulting in executing a command on the device 102 has been given, other sequences may be used.

The device 102 may have various meta-data associated with the device. This meta-data may be mapped to the meta-data 1012 and thus be accessible through the partition. For example, performance data, error data, status data, or the like related to the device 1012 may be exposed through the meta-data 1012 address range. In particular, such meta-data may include data that would not otherwise be available when the device 102 complies with a particular standard, such as a JEDEC standard or the like.

Although particular types of information, organization of the information, or the like related to the device 102 have been used as examples, in other embodiments, any types of information related to the device may be presented through a memory-mapped partition.

FIG. 11 is a schematic view of a device according to an embodiment. In this embodiment, a device 1100 includes a communication interface 1102, a controller 1104, and internal components 1106. The communication interface 1102 is coupled to the controller 1104. The communication interface 1102 is configured to enable communication between the device 1100 and other devices and/or systems. For example, the communication interface 1102 may include terminals, pins, connectors, drivers, buffers, processors, or the like to enable communication with other devices. In a particular example, the communication interface 1102 may be any interface according to one or more JEDEC standards. In other examples, the communication interface 1102 may be a USB interface, a storage device interface, an expansion bus or other computer bus interface, or the like.

The controller 1104 may include a general purpose processor, an application specific integrated circuit, a system on a chip (SOC), a programmable logic device, a microcontroller, discrete logic devices, combinations of such components, or the like. The controller 1104 may be configured to interface between the communication interface 1102 and the other internal components 1106. However, in other embodiments, the controller 1104 may be configured to control access to the internal components 1106.

The internal components 1106 include the other components of the device 1100 beyond the communication interface 1102 and the controller 1104. For example, the internal components 1106 may include data storage elements, sensors, actuators, other communication interfaces, or the like.

The controller 1104 is configured to present a logical device through the communication interface 1102. The presentation of a logical device may include a particular configuration of the controller 1104, a particular way access to the internal components 1106 is managed, or the like. For example, the controller 1104 may be configured to present a partition table listing one or more partitions as one or more logical devices. In another example, the controller 1104 may be configured to respond to communications addressed to the logical device.

The controller 1104 may be configured to enable a virtual device in response to an enable signal received through the communication interface 1102. When the virtual device is enabled, the controller 1104 is configured to present the virtual device through the communication interface 1102. For example, enabling of the virtual device may include modifying a partition table to reflect the virtual devices. In another example, the controller 1104 may now respond to communications addressed to the virtual device, i.e., a virtual device associated with an address other than an address of an existing logical device.

Once a virtual device is enabled, the virtual device may be accessed as described above. Accordingly, various operations may be performed with the device 1100 through the virtual device. For example, non-standard commands and responses may be used through the virtual device that would otherwise not be available according to a particular standard. These non-standard commands and responses may be used for optimization, debugging, performance testing, or the like.

The controller 1104 may be configured to receive a disable signal through the communication interface 1102. Accordingly, the controller 1104 may be configured to disable the virtual device in response to the disable signal. Although particular techniques of presenting a logical device or enabling a virtual device have been used as examples, other techniques of presenting devices may be used.

Figure 12:
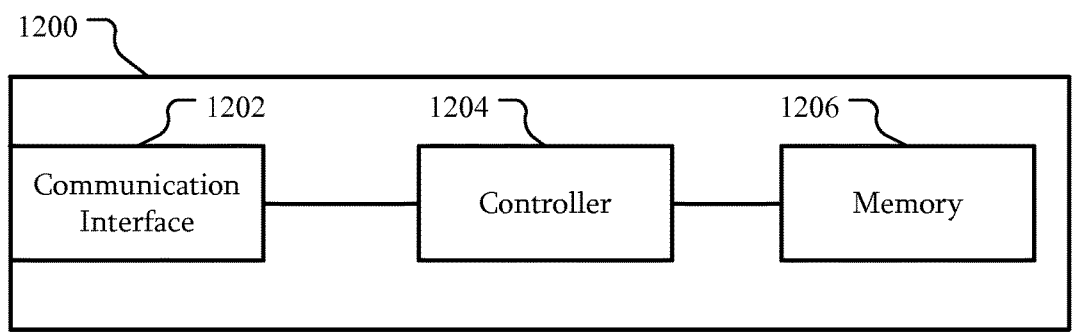
FIG. 12 is a schematic view of a memory device according to an embodiment.

FIG. 12 is a schematic view of a memory device according to an embodiment. In this embodiment, the memory device 1200 includes a communication interface 1202 and a controller 1204 similar to the communication interface 1102 and controller 1104 of FIG. 11. However, the internal components 1106 of FIG. 11 are a memory 1206. For example, the memory 1206 may be configured to store data. The memory 1206 may include a data storage media such as memory cells, disk platters, or the like.

In an embodiment, the controller 1204 is configured to present a logical storage device associated with data stored in the memory 1206. For example, the logical storage device may be a partition. As described above, the controller 1204 may be configured to enable and present a virtual device.

Accordingly, various data such as that described above may be accessible through the virtual device. For example, in an embodiment, the controller 1204 is configured to present meta-data associated with the memory 1206 as at least part of the virtual device. Here, the meta-data associated with the memory 1206 may be any data associated with the memory device 1200. In a particular example, the meta-data includes any information related to the memory device 1200 that is not the actual data stored in the memory 1206. Although the meta-data may not include actual data stored in the memory 1206, in some embodiments, such data stored in the memory 1206 may still be accessible through the virtual device. That is, the virtual device may, but need not only present meta-data associated with the memory device 1200.

In a particular embodiment, the memory device 1200 may be an eMMC device configured to be the main memory of a mobile device. Such a device 1200 may be soldered in a target system and thus, may be difficult to access for non-standard purposes such as for testing the device 1200. However, since various data as described above may be available through a virtual device, testing or other similar accesses may be easier.

Figure 13:
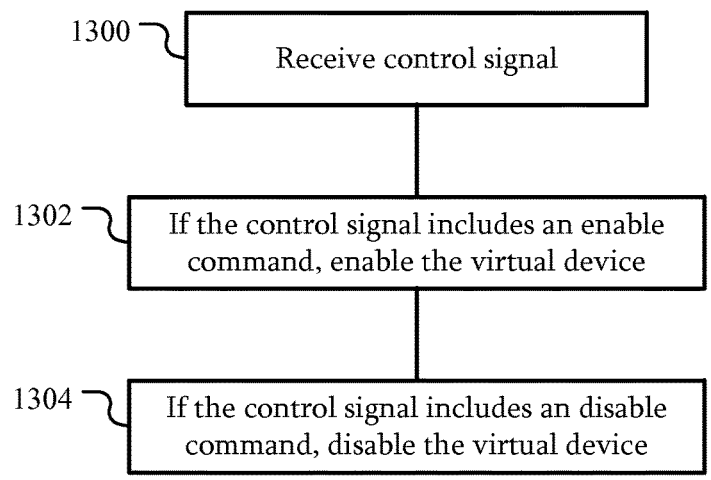
FIG. 13 is a flowchart of a technique associated with a virtual device according to an embodiment.

FIG. 13 is a flowchart of a technique associated with a virtual device according to an embodiment. Referring to FIGS. 11 and 13, the device 1100 receives a control signal in 1300. For example, a control signal, such as invalid firmware, may be received by the device 1100 through the communication interface 1102.

In 1302, if the control signal includes an enable command, the controller 1104 enables a virtual device. For example, the controller 1104 may determine if an enable command is included in the control signal. If the enable command is included in the control signal, the controller 1104 may enable the virtual device.

Similarly, in 1304, if the control signal includes a disable command, the controller 1104 disables the virtual device. For example, the controller 1104 may determine if the disable command is included in the control signal. If the disable command is included in the control signal, the controller 1104 may disable the virtual device.

Figure 14:
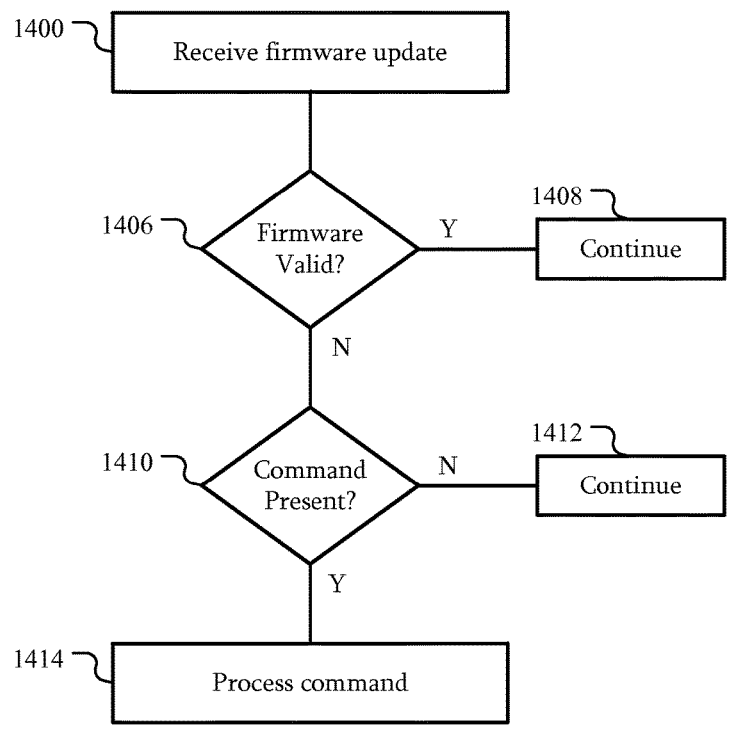
FIG. 14 is a flowchart of a technique using invalid firmware according to an embodiment.

FIG. 14 is a flowchart of a technique using invalid firmware according to an embodiment. Referring to FIGS. 11 and 14, invalid firmware is used as a particular example of a control signal. In 1400 a firmware update is received. In 1406, the controller 1104 may determine if the firmware is valid. If the firmware is valid, the controller 1104 may continue processing of the firmware in 1408. Thus, valid firmware updates may be processed as usual.

However, if the firmware is not valid, the controller 1104 may determine if a command is present in the invalid firmware in 1410. If the command is not present, the firmware may merely be invalid firmware and may be processed accordingly in 1412. However, if a command is identified, the controller 1104 may process the command in 1414. As described above, if the command is an enable command, the virtual device may be enabled. Similarly, if the command is a disable command, the virtual device may be disabled. Other commands may be similarly processed.

Figure 15:
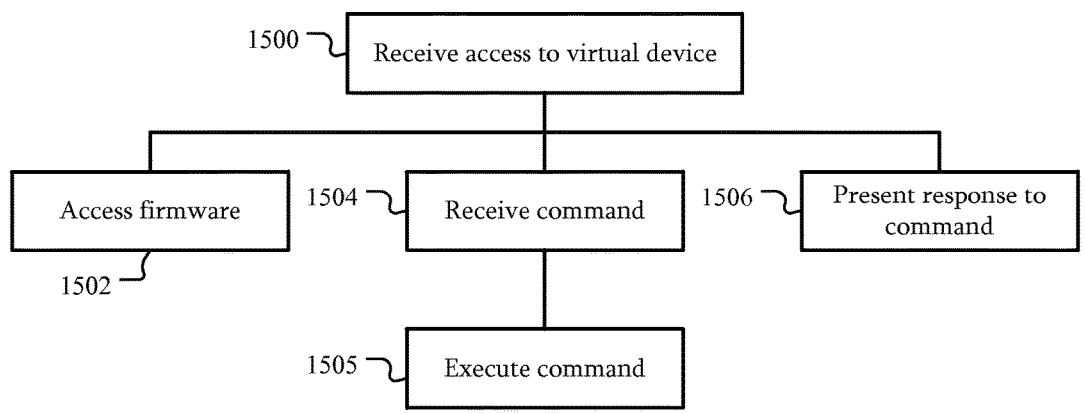
FIG. 15 is a flowchart of a technique associated with a virtual device according to another embodiment.

FIG. 15 is a flowchart of a technique associated with a virtual device according to another embodiment. Referring to FIGS. 11 and 15, in this embodiment, in 1500, a device 1100 receives an access to a virtual device in 1500. Such access may be a read, a write, or the like. In response to the access, the device 1100 may take various actions in response to that access.

In an embodiment, the device 1100 may access firmware for the device 1100 in response to the access in 1502. That is, firmware may be written and read through the virtual device. In a particular example, the virtual device may be a partition of a storage device. Reads and writes to the partition may be redirected to memory storing the firmware for the device 1100 rather than to the main storage elements.

In another embodiment, the device 1100 may receive a command written to the virtual device in 1504. In 1505, the device 1100 may execute the command. In 1506 a response to such a command may be presented by the virtual device and hence, by the device 1100.

Using the example of a partition, the command may be written to a particular address range. After writing the command, another write, another access, or other signal may cause the device to execute the command. As described above, a write to a last byte in an address range for commands may be used as the trigger to execute the command in 1505. After the command has been executed, the device 1100 may generate a response to the execution of the command. The response may be obtained by issuing a read to the device 1100 to a particular portion of the partition of the virtual device.

Figure 16:
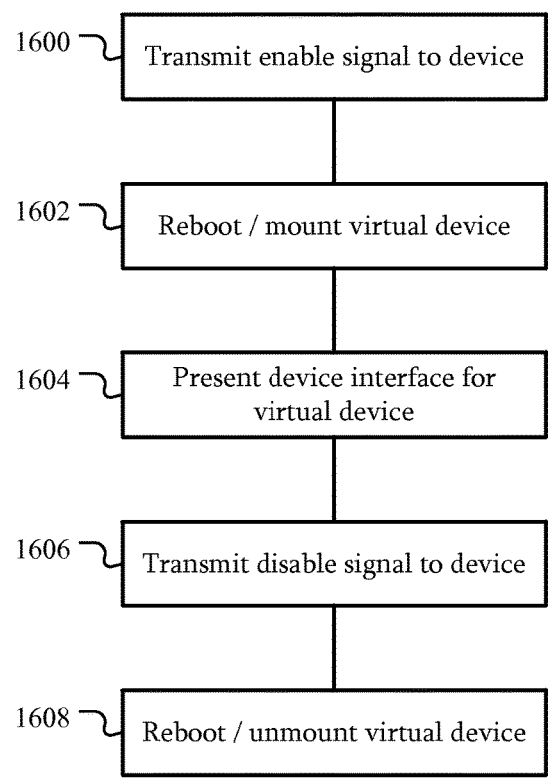
FIG. 16 is a flowchart of a technique associated with a virtual device according to another embodiment.

FIG. 16 is a flowchart of a technique associated with a virtual device according to another embodiment. Referring to FIGS. 1 and 16, in this embodiment, a processor 104 transmits an enable signal to a device 102 in 1600 to enable a virtual device of the device 102. In 1602, the processor 104 is rebooted and/or the virtual device is mounted. For example, in an embodiment, after the virtual device is enabled, the processor 104 may be rebooted. The processor 104 may then recognize the virtual device and mount the virtual device. However, in other embodiments, the processor 104 may mount the virtual device without having to be rebooted. Regardless, a device interface for the virtual device may be presented in 1604.

After the virtual device is no longer needed or desired, a disable signal may be transmitted to the device 102 in 1606. The processor 104 may again be rebooted and/or the virtual device may be unmounted in 1608. Although a particular order has been given for unmounting the virtual device and rebooting relative to transmitting the disable signal, the operations may be performed in a different order. For example, the virtual device may be unmounted before the disable signal is transmitted and the system may be rebooted after the disable signal is transmitted.

Figure 17:
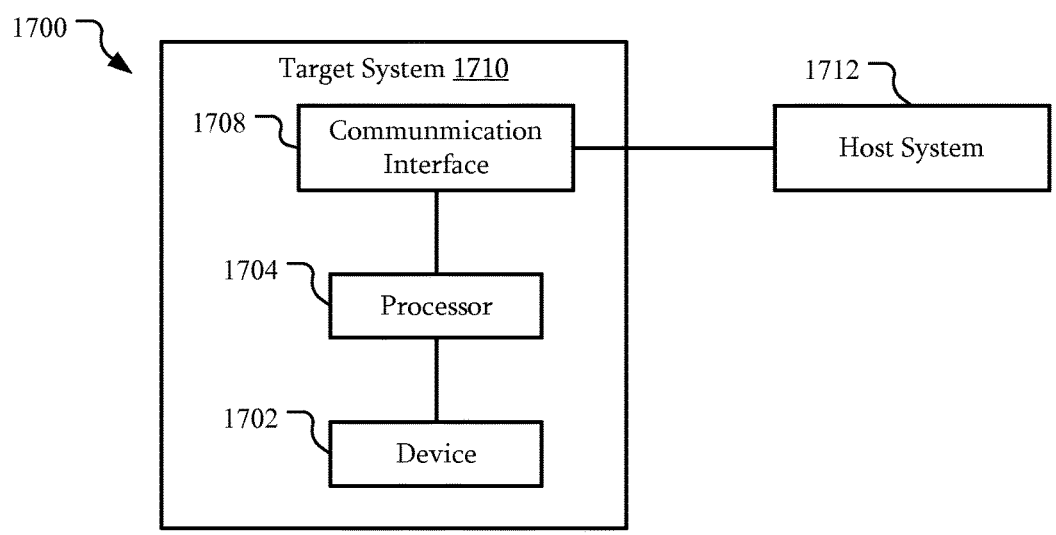
FIG. 17 is a schematic view of host and target systems according to an embodiment.

FIG. 17 is a schematic view of host and target systems according to an embodiment. In this embodiment, the system 1700 includes a target system 1710 coupled to a host system 1712. The target system 1710 includes a device 1702 coupled to a processor 1704. The device 1702 and processor 1704 may be any of the devices and processors described herein.

The processor 1704 is coupled to the communication interface 1708. The communication interface 1708 may be any variety of interfaces that allows the processor 1704 to communicate with external devices and, in particular, the host system 1712. For example, the communication interface 1708 may include a USB interface, a network interface, a Bluetooth interface, or any other interface through which systems may communicate.

The host system 1712 may be any system that is capable of communicating with the target system 1710 and capable of accessing a device interface associated with the device 1702. For example, the host system 1712 may be a personal computer, a workstation, a mobile device, a test setup, or the like. The host system 1712 is configured to access the device 1702 through the communication interface 1708.

In an embodiment, the host system 1712 may be configured to instruct the device 1702 to transition from a first operating mode to a second operating mode. In the first operating mode, the device 1702 is configured to disable a virtual device associated with the device 172 and in the second operating mode, the device 1702 is configured to enable the virtual device. The host system 1712 may be configured to instruct the device 1702 to make the transition in a variety of ways. For example, the host 1712 may install an application on the target system 1710 that is configured to transmit a control signal to enable the virtual device as described above. In another example, the host system 1712 may be configured to transmit the control signal and the processor 1704 is configured to forward the control signal on to the device 1702.

Once the virtual device is enabled, the processor 1704 is configured to make a device interface associated with the virtual device available through the communication interface 1708. The host system 1712 is configured to access the virtual device through the communication interface 1708 and the device interface presented by the processor 1704.

In an embodiment, the host system 1712 is configured to perform at least one of optimization, diagnostics, and performance testing on the device through the device interface. With access to the device 1702 through the communication interface 1708, the host system 1712 may have access to a virtual device as described above. Referring to FIGS. 10 and 17 and using the example of the memory map of FIG. 10, the host system 1712 may be configured to verify and/or modify the firmware of the device 1702 through the firmware 1004 address range. The host system 1712 may be configured to access special function registers through the SFR map 1005. The host system 1712 may be configured to write commands to execute on the device to the command tray 1008 and receive a response through the response tray 1010. Finally, the host system 1712 may access the meta-data 1012 of the device 1702. Any such information or other information available through a virtual device of the device 1702 may be used to any kind of optimization, diagnostics, performance testing, or the like.

In a particular embodiment, the presence of information through a virtual device of the device 1702 may simplify such testing. For example, the device 1702 may be capable of responding to custom or proprietary commands; however, the operating system of the target system 1710 may not be capable of transmitting such commands. The operating system, a kernel of the operating system, modules of the operating system, or the like may be replaced with components that are capable of transmitting such commands. This technique would require a change to the operating system or kernel. Such a change may require a higher privilege level than that available to typical users.

In contrast, by enabling a virtual device of the device 1702 that is a logical device that may normally be mounted or accessible by the operating system, the change to the operating system may not be necessary. That is, if the virtual device is a type of logical device that the kernel would be able to mount or access, no change to the kernel is necessary to achieve such access. Moreover, a user of the target system 1710 may not need higher privileges, such as those to replace the operating system, as the virtual device may be automatically mounted by the processor 1704, mounted by rebooting the target system 1710, or otherwise accessible with lower privileges.

In an embodiment, software may be installed on the target system 1710. For example, an app may be installed on the target system 1710. Such software may be installed by the host system 1712, installed by the target system 1710, installed by another system, or the like. The software may be configured to transmit an enable signal to transition the device 1702 from the first operating mode where the virtual device is disabled to the second operating mode where the virtual device is enabled. The enable signal may be any variety of signal described above, such as invalid firmware including an enable command.

In some embodiments, the software may provide the interface between the host system 1712 and the virtual device. For example, the software may be configured to form a communication link between the target system 1710 and the host system 1712.

Figure 18:
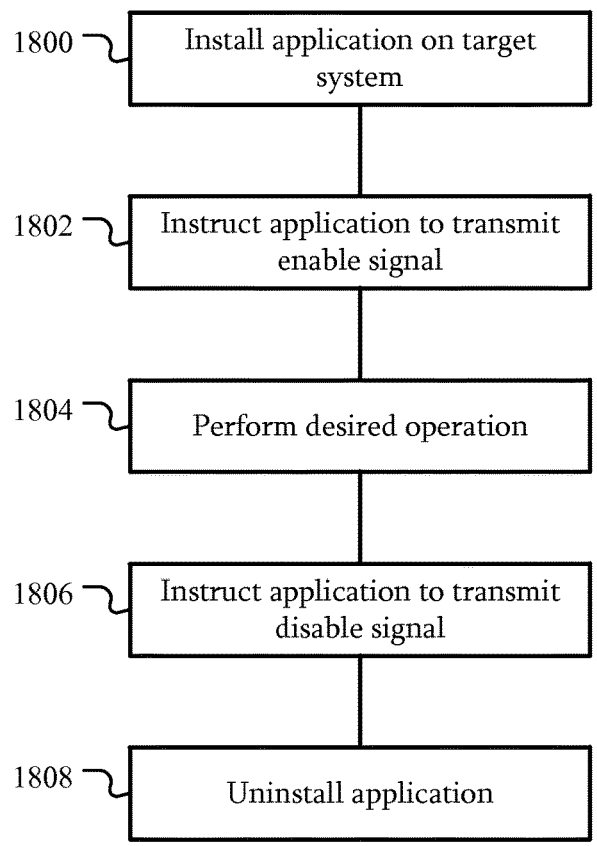
FIG. 18 is a flowchart of a technique of accessing a virtual device according to an embodiment.

FIG. 18 is a flowchart of a technique of accessing a virtual device according to an embodiment. Referring to FIGS. 17 and 18, in an embodiment, in 1800, an application is installed on the target system 1710. The application is instructed to enable a virtual device of the device 1702 in 1802. In an embodiment, the application may be instructed to enable the virtual device by the host system 1712, a user of the target system 1710, automatically after installation, or by other techniques. In 1804, the desired operations are performed, such as testing the device 1702, optimizing the device 1702, or the like.

Once the desired operations are performed, in 1806, the application may be instructed to disable the virtual device. Similar to enabling the virtual device, the application may be instructed to disable the virtual device by the hosts system 1712, by a user of the target system 1710, or the like.

The application may be uninstalled from the target system 1710 in 1808. In an embodiment, the uninstallation may be automatic after instructing the application to disable the virtual device. In another embodiment, the application may be configured to automatically disable the virtual device upon uninstallation.

Figure 19:
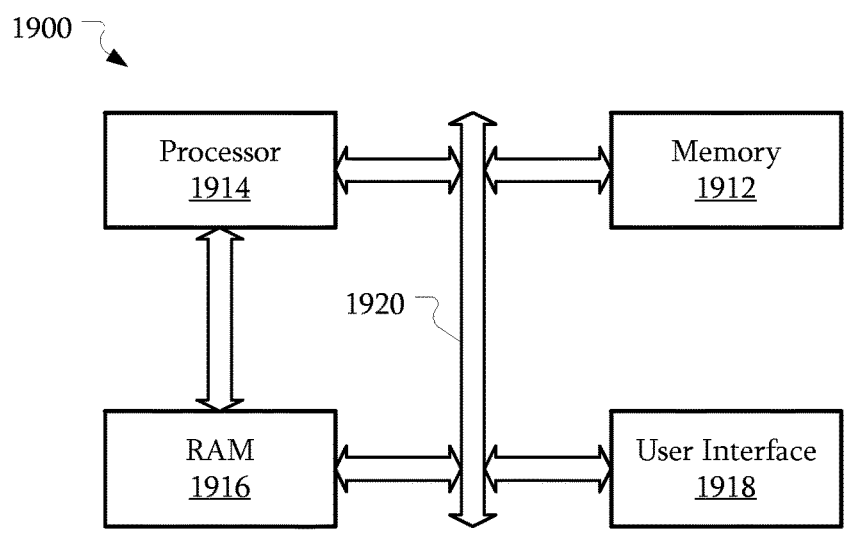
FIG. 19 is a schematic view of a system according to an embodiment.

FIG. 19 is a schematic view of a system according to an embodiment. The system 1900 may be part of a wide variety of electronic devices including, but not limited to portable notebook computers, Ultra-Mobile PCs (UMPC), Tablet PCs, laptop computers, desktop computers, servers, workstations, mobile telecommunication devices, and so on. For example, the electronic system 1900 may include a memory system 1912, a processor 1914, RAM 1916, and a user interface 1918, which may execute data communication using a bus 1920.

The processor 1914 may be a microprocessor or a mobile processor (AP). The processor 1914 may have a processor core (not illustrated) that can include a floating point unit (FPU), an arithmetic logic unit (ALU), a graphics processing unit (GPU), and a digital signal processing core (DSP Core), or any combinations thereof. The processor 1914 may execute the program and control the electronic system 1900.

The RAM 1916 may be used as an operation memory of the processor 1914. Alternatively, the processor 1914 and the RAM 1916 may be packaged in a single package body.

The user interface 1918 may be used in inputting/outputting data to/from the electronic system 1900. For example, the user interface 1918 may include a touch screen, keyboard, pointing device, network interface, peripheral interface, or the like.

The memory 1912 may store codes for operating the processor 1914, data processed by the processor 1914, or externally input data. The memory 1912 may include a controller and a memory device. The memory 1912 may include an interface to computer readable media. Such computer readable media may store instructions to perform the variety of operations describe above.

In an embodiment, the processor 1914 may be configured to perform some or all of the operations of the various processors described above. Moreover, any one of the RAM 1916, memory 1912, user interface 1918, or other components of the electronic system 1900 may include a device as described above. Accordingly, the processor 1914 may be configured to enable a virtual device of any such device and perform any of the associated operations.

Figure 20:
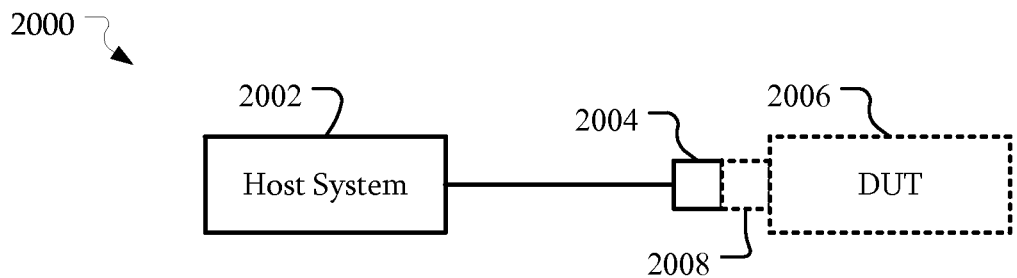
FIG. 20 is a schematic view of a test setup according to an embodiment.

FIG. 20 is a schematic view of a test setup according to an embodiment. In this embodiment, a test setup 2000 includes a host system 2002. The host system 2002 is coupled to an interface 2004. The interface 2004 may be any interface suitable for connecting to a corresponding interface 2008 of a device under test (DUT) 2006. For example, the interface 2004 could be a wired interface, a wireless interface, a USB interface, a Bluetooth interface, or the like. The interface 2008 may be a similar corresponding interface.

The DUT 2006 may be any device that may present a virtual device as described above. Accordingly, the host system 2002 may be configured to test the DUT 2006 and, in particular a device within the DUT 2006. In a particular embodiment, the test setup 2000 may be outside of a manufacturing environment or in the field. Accordingly, a user of the test setup 2000 may not have privileges on the DUT 2006 to recompile and/or install a different kernel to allow the user to test a device in the DUT 2006. Moreover, the device on the DUT 2006 may be soldered in place and thus, relatively more difficult to test in contrast to a removable device. However, as the user may merely install an application on the DUT 2006 and test the device as described above, a difficulty of testing such devices in relatively inaccessible locations decreases.

Figure 21:
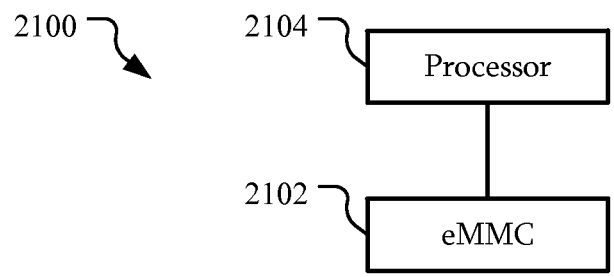
FIG. 21 is a schematic view of a system with an eMMC according to an embodiment.

FIG. 21 is a schematic view of a system with an eMMC according to an embodiment. In this embodiment, the system 2100 includes an eMMC 2102 and a processor 2104. The eMMC 2102 may be a main memory device for the system 2100. In a particular example, the system 2100 may be a mobile communication device; however, the system may take other forms. The eMMC 2102 and processor 2104 may be configured as the devices and processors described above.

Figure 22:
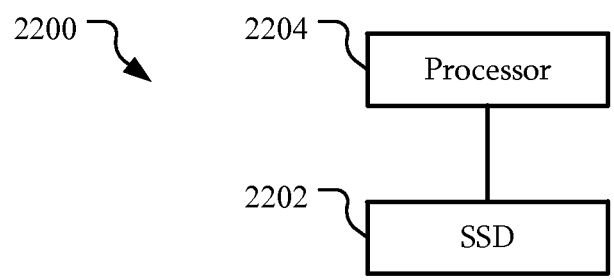
FIG. 22 is a schematic view of a system with an SSD according to an embodiment.

FIG. 22 is a schematic view of a system with an SSD according to an embodiment. In this embodiment, the system 2200 includes a solid state disk (SSD) 2202. The SSD 2202 may be a main storage device for the system 2200. In a particular example, the system 2200 may be a laptop computer, a tablet computer, or a desktop computer; however, the system may take other forms. The SSD 2202 and processor 2204 may be configured as the devices and processors described above.

An embodiment includes a system, comprising: a device configured to present a logical device and enable a virtual device in response to a control signal; and a processor coupled to the device and configured to: present the logical device through a first device interface; transmit the control signal to the device to enable the virtual device; and after the virtual device is enabled, present the virtual device through a second device interface.

In an embodiment, the control signal includes invalid firmware.

In an embodiment, the processor is configured to transmit invalid firmware to the device; and the device is configured to enable the virtual device in response to a command included in the invalid firmware.

In an embodiment, the device includes a storage device; and the logical device is a first partition of the storage device and the virtual device is a second partition of the storage device.

In an embodiment, at least part of the second partition includes a memory-mapped interface to attributes of the device.

In an embodiment, the attributes of the device include at least one of: firmware for the device; a command queue; a response queue; and meta-data of the device.

In an embodiment, the system further comprises: a communication interface coupled to the processor: a host system coupled to the communication interface and configured to access the device through the second device interface.

In an embodiment, the host system is configured to perform at least one of optimization, diagnostics, and performance testing on the device through the second device interface.

An embodiment includes a device, comprising: a communication interface; and a controller coupled to the communication interface; the controller configured to: present a logical device through the communication interface; enable a virtual device in response to an enable signal received through the communication interface; and when the virtual device is enabled, present the virtual device through the communication interface.

In an embodiment, the controller is configured to present a partition table; the logical device is a first partition in the partition table; and when the virtual device is enabled, the virtual device is a second partition in the partition table.

In an embodiment, the device further comprises: a memory coupled to the controller; wherein: the logical device is a logical storage device associated with data stored in the memory; the controller is configured to present meta-data associated with the memory as at least part of the virtual device.

In an embodiment, the controller is configured disable the virtual device in response to a disable signal received through the communication interface.

In an embodiment, the enable signal includes invalid firmware.

An embodiment includes a method, comprising: receiving, by a device presenting a logical device, a control signal; determining, by the device, if an enable command is included in the control signal; and enabling, by the device, a virtual device in response to the enable command.

In an embodiment, the method further comprises: determining, by the device, if a disable command is included in the control signal; and disabling, by the device, the virtual device in response to the disable command.

In an embodiment, receiving, by the device, the control signal comprises receiving, by the device, a transmission of firmware for the device.

In an embodiment, determining, by the device, if the enable command is included in the control signal comprises: determining, by the device, if the transmitted firmware is invalid; and if the transmitted firmware is invalid, determining, by the device, if the enable command is included in the transmitted firmware.

In an embodiment, the method further comprises: determining, by the device, if the transmitted firmware is invalid; if the transmitted firmware is invalid, determining, by the device, if a disable command is included in the transmitted firmware; and disabling, by the device, the virtual device in response to the disable command.

In an embodiment, the method further comprises: receiving, by the device, an access to the virtual device; accessing, by the device, firmware for the device in response to the access to the virtual device.

In an embodiment, the method further comprises: receiving, by the device, a write to the virtual device, the write including a command; and executing, by the device, the command.

In an embodiment, the method further comprises: generating, by the device, a response to the execution of the command; receiving, by the device, a read associated with the virtual device; and transmitting, by the device, the response to the execution of the command in response to the read.

An embodiment includes a method, comprising: instructing a device on a target system to transition from a first operating mode to a second operating mode, wherein: in the first operating mode, the device is configured to disable a virtual device associated with the device; and in the second operating mode, the device is configured to enable the virtual device; and accessing the virtual device through the target system.

In an embodiment, the method further comprises: installing software on the target system, the software configured to transmit an enable signal to transition the device from the first operating mode to the second operating mode.

In an embodiment, the method further comprises: rebooting the target system after transmitting the enable signal.

In an embodiment, the method further comprises: transmitting a disable signal to transition the device from the second operating mode to the first operating mode; and uninstalling the software from the target system; wherein transmitting the disable signal and uninstalling the software are initiated in response to a single input.

Although the devices, methods, and systems have been described in accordance with particular embodiments, one of ordinary skill in the art will readily recognize that many variations to the disclosed embodiments are possible, and any variations should therefore be considered to be within the spirit and scope of the devices, methods, and systems disclosed herein. Accordingly, many modifications may be made by one of ordinary skill in the art without departing from the spirit and scope of the appended claims.

The invention claimed is:

1. A device, comprising:
a communication interface; and
a controller coupled to the communication interface;
wherein the controller is configured to:
present a logical device through the communication interface;
enable a virtual device in response to an enable signal received through the communication interface; and
when the virtual device is enabled, present the virtual device through the communication interface; and
wherein the enable signal includes invalid firmware.

2. A method, comprising:
receiving, by a device presenting a logical device, a control signal;
determining, by the device, if an enable command is included in the control signal; and
enabling, by the device, a virtual device in response to the enable command;
wherein receiving, by the device, the control signal comprises receiving, by the device, a transmission of invalid firmware for the device.

3. The method of claim 2, further comprising:
receiving, by the device, an access to the virtual device; and
accessing, by the device, current firmware for the device in response to the access to the virtual device.

4. The method of claim 2, further comprising:
receiving, by the device, a write to the virtual device, the write including a command;
executing, by the device, the command;
generating, by the device, a response to the execution of the command;
receiving, by the device, a read associated with the virtual device; and
transmitting, by the device, the response to the execution of the command in response to the read.

5. The device of claim 1, wherein the enable signal is a command within the invalid firmware.

6. The device of claim 1, wherein the controller is configured to:
receive firmware through the communication interface;
determine if the firmware is invalid; and
if the firmware is invalid, determine, if the enable signal is included in the firmware.

7. The device of claim 1, wherein the controller is configured to:
receive firmware through the communication interface;
determine if the firmware is invalid;
if the firmware is invalid, determine if a disable command is included in the firmware; and
disable the virtual device in response to the disable command.

8. The device of claim 1, wherein the controller is configured to:
receive an access to the virtual device through the communication interface; and
access firmware for the device in response to the access to the virtual device.

9. The device of claim 1, wherein the controller is configured to:
receive a write to the virtual device through the communication interface, the write including a command;
execute the command;
generate a response to the execution of the command;
receive a read associated with the virtual device; and
transmit the response to the execution of the command in response to the read through the communication interface.

10. The method of claim 2, further comprising:
determining, by the device, if a disable command is included in the invalid firmware; and
disabling, by the device, the virtual device in response to the disable command.

* * * * *